(12) United States Patent
Bopardikar et al.

(10) Patent No.: US 9,848,028 B2
(45) Date of Patent: Dec. 19, 2017

(54) CLASSIFICATION OF WEB CLIENT NETWORK BANDWIDTH BY A WEB SERVER

(76) Inventors: Rohan Bopardikar, Sunnyvale, CA (US); Nikhil Bopardikar, Sunnyvale, CA (US)

( * ) Notice: Subject to any disclaimer, the term of this patent is extended or adjusted under 35 U.S.C. 154(b) by 693 days.

(21) Appl. No.: 13/269,707

(22) Filed: Oct. 10, 2011

(65) Prior Publication Data
US 2013/0091268 A1    Apr. 11, 2013

(51) Int. Cl.
G06F 15/173    (2006.01)
H04L 29/08    (2006.01)
H04L 12/801    (2013.01)
H04L 12/841    (2013.01)

(52) U.S. Cl.
CPC ........... *H04L 67/02* (2013.01); *H04L 47/196* (2013.01); *H04L 47/283* (2013.01); *H04L 67/322* (2013.01)

(58) Field of Classification Search
USPC ......................................................... 709/224
See application file for complete search history.

(56) References Cited

U.S. PATENT DOCUMENTS

2003/0233445 A1* 12/2003 Levy et al. ................... 709/224
2012/0120800 A1*  5/2012 Lientz et al. ................. 370/235
2012/0254456 A1* 10/2012 Visharam et al. ............ 709/231

* cited by examiner

*Primary Examiner* — Abdullahi E Salad
(74) *Attorney, Agent, or Firm* — Hickman Palermo Becker Bingham LLP

(57) ABSTRACT

This invention provides apparatuses, methods, and systems for classification of a web client's network bandwidth by a web server in real time over the Internet. The web server, based upon the round trip time (RTT) taken to establish the TCP connection with the web client, classifies the network bandwidth. The RTT for establishment of the TCP connection using a 3-way handshake is stored on the web server on most modern Operating Systems and can be fetched on demand by the web server for a given connection. A web application on the web server could then use this bandwidth classification to serve varied content to the web client, such as a light or heavy web page depending on the level of the bandwidth.

15 Claims, 3 Drawing Sheets

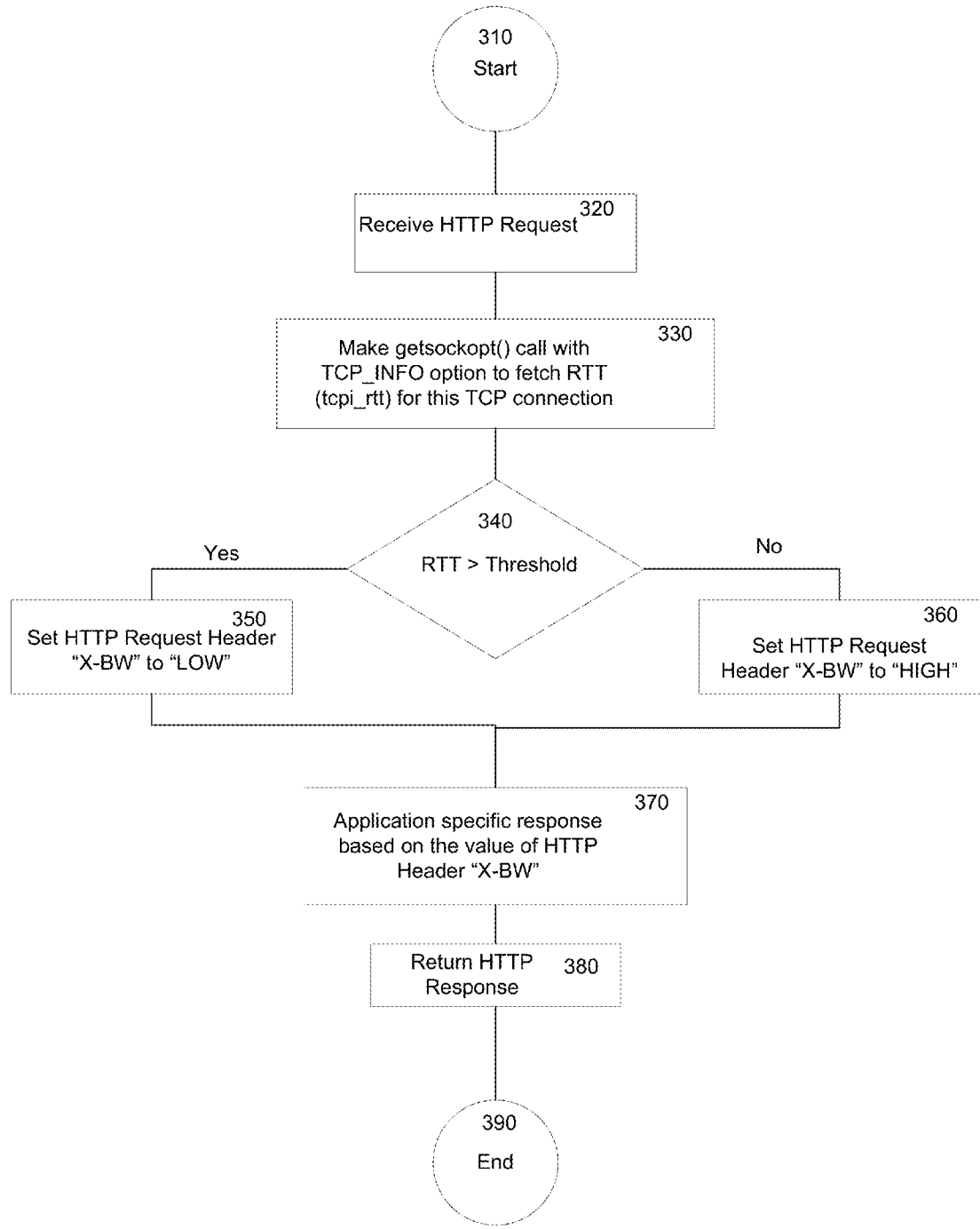

CLASSIFICATION OF WEB CLIENT NETWORK BANDWIDTH BY A WEB SERVER

TECHNICAL FIELD

This disclosure relates to classification of a web client's network bandwidth by a web server in real time over a Transmission Control Protocol (TCP) based network.

BACKGROUND

Client-Server architecture entails client computers such as personal computers, laptops, smart-phones and tablet devices connected to server computers over a network. The client requests information from the server over the network using an agreed upon protocol and the server transmits the requested information back to the client.

The World Wide Web (WWW) is an example of the client-server architecture that is in popular use today. It entails a web client such as a web browser and a web server that are connected over a global system of interconnected computer networks called the Internet. The Internet uses the Transmission Control Protocol (TCP) as it's standard guaranteed delivery Transport Layer protocol.

The Hypertext Transfer Protocol (HTTP) serves as a Request-Response protocol over the World Wide Web. The web browser (or client) often referred to as a user agent (UA) submits a HTTP Request message to the web server. The web server in turn responds with a HTTP Response message containing resources such as Hypertext Markup Language (HTML) files to the web browser. The HTTP is an Application Layer protocol for the World Wide Web and operates on top of TCP, which is a Transport Layer protocol. The HTTP messages also carry HTTP header fields that define the operating parameters of an HTTP transaction. Further, these HTTP headers fall into standard and non-standard (prefixed with X-) categories.

A TCP connection between the web client and the web server is a virtual circuit protocol that guarantees an ordered delivery of data between the two. This connection is established using a 3-way handshake between the web client and the web server. In practice there are data buffers on the web client, web server and intermediate routers and switches that can delay the transfer of data introducing latencies and impacting the performance of the TCP connection.

BRIEF DESCRIPTION OF THE DRAWINGS

In the drawings:

FIG. 3 is a diagram of the process flowchart used by the web server to classify the network bandwidth of the web client.

DESCRIPTION OF EXAMPLE EMBODIMENTS

In the following description, for illustrative purposes, several specific details are set forth in order to provide a clear understanding of the present invention. However, this invention is not limited in scope to these specific details.

Figure 1:
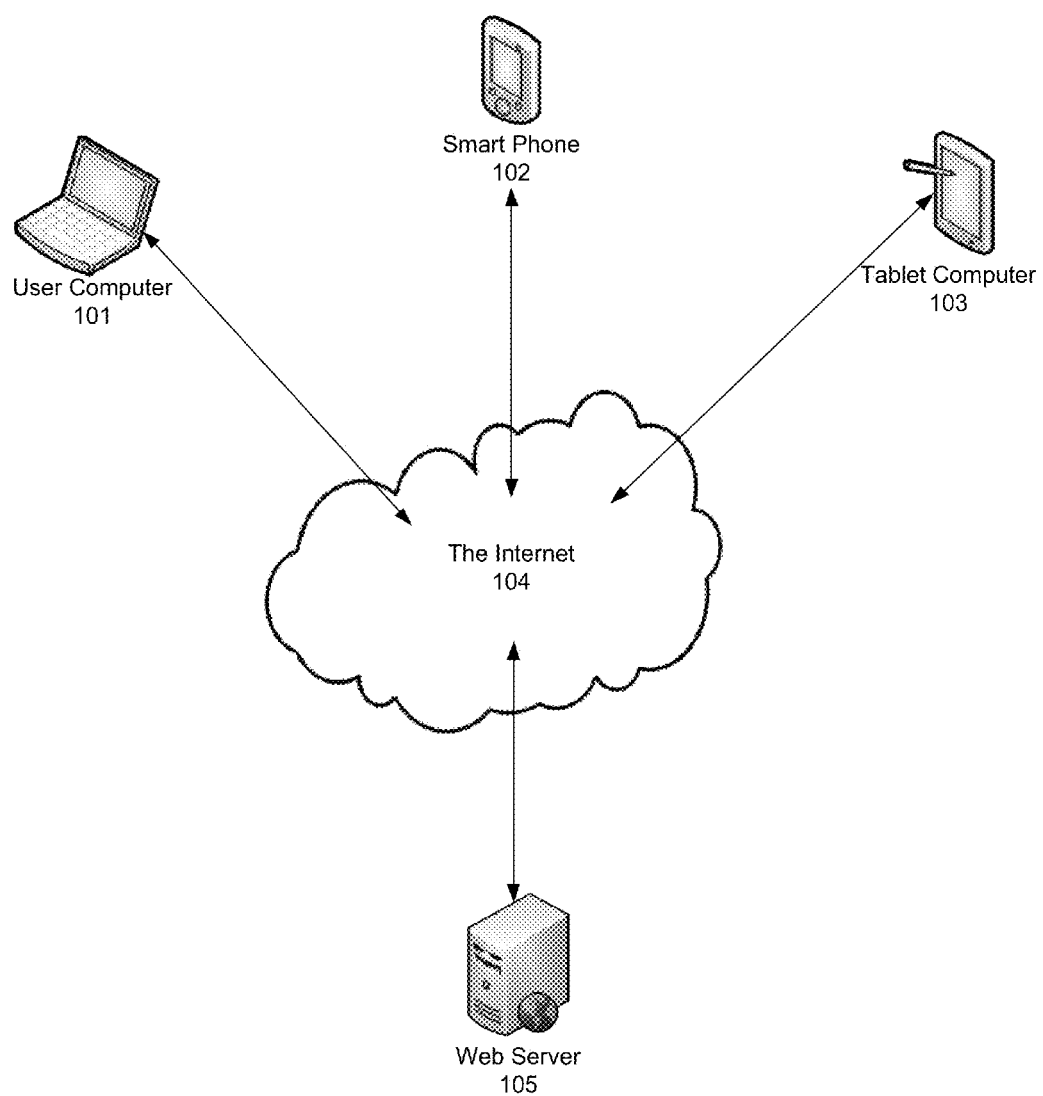
FIG. 1 illustrates a client server network for implementing an embodiment of this invention.

Embodiments are described herein according to the following outline:

1.0. Client Server Network
2.0. Classification of web client network bandwidth
3.0. Extensions and Alternatives 1.0. Client Server Network FIG. 1 illustrates a block diagram of the client server network for implementing an embodiment of the invention. It depicts web clients 101, 102 and 103 that are connected to the web server 105 over a network such as the Internet 104. It should be noted that other networks can also be used in lieu of, or in addition to the Internet 104 such as a virtual private network (VPN), dialup modem connection, satellite link, an intranet, an extranet or a non-TCP based network.

As shown in FIG. 1 a web client could include a variety of devices such as a laptop or a desktop computer, a smart phone, or a tablet computer. The web clients 101, 102 and 103 typically run a web browsing program such as Microsoft's Internet Explorer™, Mozilla's Firefox™, Google's Chrome™ or Apple's Safari™ that connects over the Internet 104 to a web server 105.

Web clients 101, 102 and 103 typically include a user input device such as a keyboard and mouse or a touchscreen or a stylus/pen. They also include a display device such as a monitor or screen. The web browser uses these input and display devices to interact with the user while communicating with the web server 105 over the Internet 104.

2.0. Classification of Web Client Network Bandwidth

Figure 2:
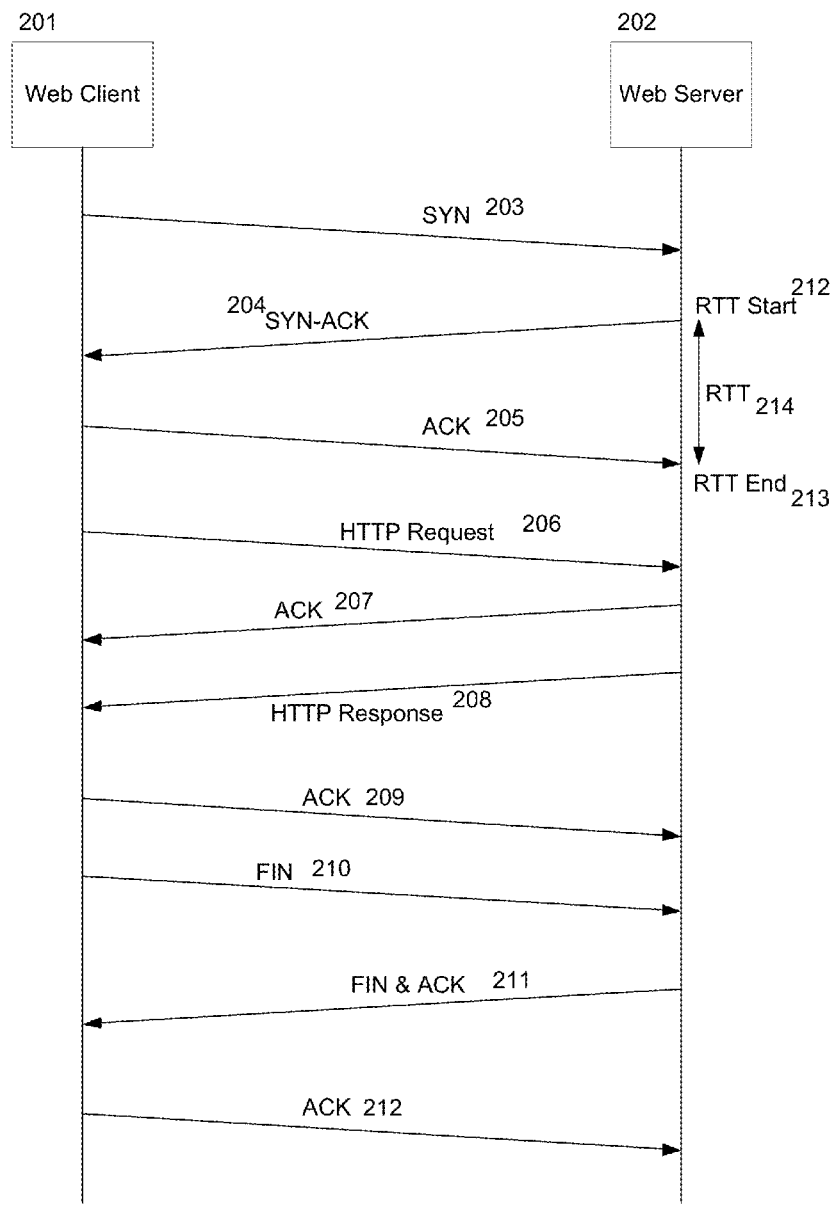
FIG. 2 illustrates TCP communication between a web client and a web server.

FIG. 2 depicts sample communication between a web client 201 and a web server 202 in one embodiment of the invention. In this embodiment the web client 201 communicates with the web server 202 over a computer network using the TCP protocol or any other connection oriented or connectionless protocol that involves a round trip exchange of packets to establish the connection. The web client 201 initiates the connection by sending a SYN packet 203 to the web server 202. The web server 202 in turn responds at time RTT Start 212 with a SYN-ACK packet 204. The web client 201 on receipt of the SYN-ACK packet 204 responds with an ACK packet 205. The web server 202 receives the ACK packet 205 at time RTT End 213. The exchange of these three packets (203, 204, 205) also known as a 3-way handshake establishes a TCP connection between the web client and the web server. The difference in time between RTT End 213 and RTT Start 212, RTT 214, is recorded by the TCP software (typically part of the Operating System) on the web server 202 as a part of the data stored and associated with this connection. Modern Operating Systems enable the web server 202 to fetch RTT 214 for a TCP connection using socket library calls such as the getsockopt( ) call with TCP_INFO option on the Linux Operating System at any time after the connection has been established.

The web client 201 and the web server 202 now exchange data formatted for HTTP, which is an application level protocol. The web client 201 makes HTTP Request 206 and the web server responds with HTTP Response 208. Packets such as ACK 207 are used to acknowledge receipt of data since TCP is a reliable connection oriented protocol. The web server 202 on receiving the first data request from the web client, HTTP Request 206, fetches RTT 214 for this connection from the Operating System and uses it to classify the web client 201 network bandwidth by comparing RTT 214 to one or more thresholds. In one embodiment of this invention, the web server 202 may classify the network bandwidth to be "HIGH" or "LOW" depending on whether the RTT 214 value was below or above 500 milliseconds. Once the web server 202 classifies the network bandwidth, it passes this information to the web application server in one embodiment of this invention by means of setting an extended HTTP header "X-BW" with a value of "HIGH" or "LOW". The web application server could vary the response to HTTP Request 206 depending on the network bandwidth being "HIGH" or "LOW" and have the web server 202 send HTTP Response 208 to the web client 201. The initial HTTP Request 206 and the initial HTTP Response 208 could be followed by additional HTTP packet exchanges between the web client 201 and web server 202.

The TCP connection between the web client 201 and the web server 202 is terminated by an exchange of FIN packets between the two coupled with corresponding ACK packets. Either side of the TCP connection can initiate the termination by sending a FIN packet to the other side.

TCP uses an algorithm called Slow-start for congestion control to avoid sending more data than the network is capable of transmitting. As a result of the TCP Slow-start algorithm the initial bandwidth of the TCP connection that impacts the user experience on the web client is directly co-related to the RTT. The algorithm starts with injecting small number of packets into the network and increases this rate of injection based on the rate at which acknowledgments are returned from the other end. Therefore, larger the RTT, longer it takes for the acknowledgments to be received and smaller the rate of increase of packet injection into the network resulting in a lower bandwidth connection. Conversely, smaller the RTT, faster it takes for acknowledgments to be received and faster the rate of increase of packet injection into the network resulting in a higher bandwidth connection. For this reason RTT is a good indicator of the initial real-time network bandwidth of the web client without any prior knowledge about the web client.

Web clients that are connected to the Internet over modems or wireless data networks or satellite-based networks have larger RTTs and are also prone to packet losses. The TCP Slow-start algorithm is very sensitive to such packet losses and reacts immediately with significant reduction of packet injection into the network. The invention described herein classifies such web clients as having "LOW" bandwidth due to their larger RTTs. In one embodiment of the invention, the web application server can choose to serve such web clients "lighter" content that involves sending fewer packets, thereby reducing the amount of packet loss, resulting in a superior user experience.

FIG. 3 depicts one embodiment of the invention for the flow chart that could be used by the web server to classify the network bandwidth of the web client. The web server receives a HTTP request from the web client in step 320. The web server may receive the request over a Hypertext Transfer Protocol Secure (HTTPS) connection that provides encrypted communication over the Internet along with a secure identification. In step 330, on the Linux Operating System, the web server makes a getsockoptO socket library call with the TCP_INFO option to fetch the information described in struct tcp_info defined in the netinet/tcp.h header file. When the getsockoptO call completes the information returned contains the value for tcpi__rtt described in struct tcp_info in micro-seconds. This is the value of RTT. Other modem Operating Systems have similar means of fetching the value of RTT for an established TCP connection. In step 340 the web server compares the value of RTT to a pre-determined Threshold such as for example 500 milliseconds. If the value of RTT is greater than the Threshold it proceeds to step 350, else it proceeds to step 360. In step 350, it adds an extended HTTP Request Header, "X-BW" with a value "LOW" to the existing HTTP Request Headers. On the other hand in step 360 it adds an extended HTTP Request Header, "X-BW" with a value "HIGH" to the existing HTTP Request Headers. In step 370, the web application retrieves the value of the extended HTTP Request Header "X-BW" to provide a varied response to the web client depending on the value being "LOW" or "HIGH". In step 380, the web server returns the HTTP Response composed by the web application server in step 370.

In one embodiment of the invention, the web server may set a cookie value while sending the HTTP Response in step 380 to the web client, to indicate the classification of the web client's network bandwidth.

3.0. Extensions and Alternatives

The specifications and drawings in this invention are intended as an illustration rather than a narrow and restricted implementation. Embodiments of the invention detailed here may vary in their implementation. For example some of them could be implemented in firmware or hardware in addition to, instead of, or in combination with software. Therefore the invention is not intended to be limited, except by the set of claims that issue from this application, including any subsequent modifications.

In an embodiment, a method comprises receiving HTTP Request from a web client by a web server over the Internet; causing the web server to fetch the TCP Round Trip Time (RTT) for the TCP connection on which the HTTP Request arrived; comparing the RTT to a pre-determined threshold; setting a non-standard HTTP Request Header (X-BW) to indicate a high or low bandwidth depending on whether the RTT is below or above a pre-determined threshold; causing the web application to send a varied response to the web client depending on the value of X-BW. The web server may receive the request over a Hypertext Transfer Protocol Secure (HTTPS) connection that provides encrypted communication over the Internet along with a secure identification of the web server by the web client. Any client communicates with any server over a TCP based network using any application level protocol. The web server may classify the web client's network bandwidth into more than two categories such as for example three categories (high, medium, low). In one feature a web application fetches the bandwidth set by the web server in the non-standard HTTP Request Header (X-BW) to decide to inline Cascading Style Sheets (CSS) and/or JavaScript in the HTTP Response in case of high bandwidth web clients. In one feature a web application fetches the bandwidth set by the web server in the non-standard HTTP Request Header (X-BW) to decide to set longer cache durations and/or to make more extensive use of a Content Delivery Network (CDN) for CSS, JavaScript or Images in the HTTP Response in case of low bandwidth web clients. In one feature a web application fetches the bandwidth set by the web server in the non-standard HTTPRequestHeader (X-BW) to decide to serve a relatively lighter content in the HTTPResponse in case of low bandwidth web clients. This may be potentially followed by delayed serving of some content using methods such as AJAX. In one feature a web server decides to redirect or forward the incoming HTTP Request to different Uniform Resource Locators (URLs) or web applications depending on the value of RTT. In one feature a web application fetches the bandwidth set by the web server in the non-standard HTTP Request Header (X-B W) to decide to redirect or forward the incoming HTTP Request to a set of different Uniform Resource Locators (URLs). In one feature a web server sets an indicator for the web client's network bandwidth in a standard HTTP Request Header. In one feature a web server sets an indicator for the web client's network bandwidth outside of the HTTP Request Headers. In one feature a web server uses information in the HTTP Request Header in addition to the RTT it has obtained from the TCP connection to categorize the web client's network bandwidth. For example, User Agent information in the HTTP Request Header that could indicate if the web client is a smart-phone. In one feature a web server uses information in the HTTP Cookie to categorize the web client's network bandwidth. For example, a particular user preference may have been stored in the HTTP Cookie that could be used in addition to the RTT for bandwidth categorization. Alternately, the web server may have stored a value in the HTTP cookie during the first HTTP Request/Response interaction to indicate the web client's network bandwidth that could be fetched and reused during subsequent HTTP Requests. The web server and the web application server may not be distinct, thereby not requiring setting an indicator for the web client's network band-width such as in the HTTP Request Headers. In some cases, the client and server communicate over the network using any connection oriented or connectionless network transport protocol and the server stores or utilizes the round trip time of their initial communication to classify the client's network bandwidth. Further the application level protocol is not restricted to HTTP or HTTPS and could be any standard or proprietary application level protocol. For example, the Application protocol could be SPDY instead of HTTP or the Transport protocol could be SCTP instead of TCP.

What is claimed is:

1. A method comprising:
   receiving an HTTP Request from a web client by a web server over the Internet;
   causing the web server to fetch a TCP Round Trip Time (RTT) for a TCP connection on which the HTTP Request arrived;
   comparing the RTT to a pre-determined threshold;
   setting a non-standard HTTP Request Header (X-BW) to indicate a high or low bandwidth depending on whether the RTT is below or above the pre-determined threshold;
   causing a web application at the web server to send a varied response to the web client depending on the value of the X-BW;
   wherein the web application fetches the bandwidth set by the web server in the non-standard HTTP Request Header (X-BW), and (a) in response to determining that the X-BW indicates high bandwidth, generates inline Cascading Style Sheets (CSS) or JavaScript in the HTTP Response, or (b) redirects or forwards the incoming HTTP Request to a set of different Uniform Resource Locators (URLs) based upon the value of the bandwidth.

2. The method of claim 1, wherein the web server receives the HTTP Request over a Hypertext Transfer Protocol Secure (HTTPS) connection that provides encrypted communication over the Internet along with a secure identification of the web server by the web client.

3. The method of claim 1, wherein the web client communicates with the web server over a TCP based network using an application level protocol.

4. The method of claim 1, wherein the web server classifies the web client's network bandwidth into more than two categories.

5. The method of claim 1, wherein the web application fetches the bandwidth set by the web server in the non-standard HTTP Request Header (X-BW), and in response to determining that the X-BW indicates low bandwidth, sets longer cache durations in the HTTP Response.

6. The method of claim 1, wherein the web application fetches the bandwidth set by the web server in the non-standard HTTPRequestHeader (X-BW), and in response to determining that the X-BW indicates a low bandwidth, serves a relatively lighter content in the HTTPResponse.

7. The method of claim 1, wherein the web server redirects or forwards the incoming HTTP Request to different Uniform Resource Locators (URLs) or web applications depending on the value of the RTT.

8. The method of claim 1, wherein the web server sets an indicator for the web client's network bandwidth in a standard HTTP Request Header.

9. The method of claim 1, wherein the web server uses information in the HTTP Request Header in addition to the RTT from the TCP connection to categorize the web client's network bandwidth.

10. The method of claim 1, wherein the web server uses information in a HTTP Cookie to categorize the web client's network bandwidth.

11. The method of claim 1, further comprising causing the web server to fetch the TCP RTT for the TCP connection on which the HTTP Request arrived and using a particular TCP RTT value that was calculated as part of a three-way TCP handshake associated with the connection.

12. A data processing method comprising:
   receiving an application level protocol Request from a client by a server over the Internet;
   causing the web server to fetch a Round Trip Time (RTT) for a transport connection on which the Request arrived;
   comparing the RTT to a pre-determined threshold;
   setting a header value in a Response in the application level protocol to indicate a high or low bandwidth depending on whether the RTT is below or above the pre-determined threshold;
   causing an application program at the server to send a varied response to the client depending on the value of the header value;
   wherein the web application fetches the bandwidth set by the web server in the non-standard HTTP Request Header (X-BW), and (a) in response to determining that the X-BW indicates high bandwidth, generates inline Cascading Style Sheets (CSS) or JavaScript in the HTTP Response, or (b) redirects or forwards the incoming HTTP Request to a set of different Uniform Resource Locators (URLs) based upon the value of the bandwidth.

13. The method of claim 12, wherein causing the server to fetch comprises causing the server to fetch the RTT for any one of: a connectionless network transport protocol and SCTP.

14. The method of claim 12, wherein the application level protocol is any one of: SPDY and HTTP.

15. The method of claim 12, further comprising causing the web server to fetch the RTT for the transport connection on which the Request arrived and using a particular RTT value that was calculated as part of a transport connection handshake process associated with the connection.

* * * * *